United States Patent
Satyamsetti et al.

(10) Patent No.: US 12,463,821 B2
(45) Date of Patent: Nov. 4, 2025

(54) COMPUTING SYSTEMS FEATURING CENTRALIZED ATTESTATION DEVICE

(71) Applicant: Google LLC, Mountain View, CA (US)

(72) Inventors: Vidya Bharat Satyamsetti, Bothell, WA (US); Jeffrey Thomas Andersen, Kirkland, WA (US); Jordan Thomas Hand, Woodinville, WA (US); Christopher Edward Fenner, Kirkland, WA (US)

(73) Assignee: GOOGLE LLC, Mountain View, CA (US)

(*) Notice: Subject to any disclaimer, the term of this patent is extended or adjusted under 35 U.S.C. 154(b) by 0 days.

(21) Appl. No.: 18/250,838

(22) PCT Filed: Mar. 22, 2023

(86) PCT No.: PCT/US2023/015858
§ 371 (c)(1),
(2) Date: Apr. 27, 2023

(87) PCT Pub. No.: WO2023/183361
PCT Pub. Date: Sep. 28, 2023

(65) Prior Publication Data
US 2024/0364531 A1      Oct. 31, 2024

Related U.S. Application Data (60) Provisional application No. 63/322,348, filed on Mar. 22, 2022.

(51) Int. Cl.
*H04L 9/32* (2006.01)
*G06F 21/57* (2013.01)
*H04L 9/08* (2006.01)

(52) U.S. Cl.
CPC ............ *H04L 9/3242* (2013.01); *G06F 21/57* (2013.01); *H04L 9/0825* (2013.01); *H04L 9/0877* (2013.01)

(58) Field of Classification Search
CPC ... H04L 9/3242; H04L 9/0825; H04L 9/0877; G06F 21/57; G06F 21/73
See application file for complete search history.

(56) References Cited

U.S. PATENT DOCUMENTS

| 11,956,626 B2 * | 4/2024 | Bjerrum | H04W 12/04 |
| 2018/0183609 A1 | 6/2018 | Shaw et al. | |

(Continued)

FOREIGN PATENT DOCUMENTS

| CN | 111264044 A * | 6/2020 | G06F 21/57 |
| EP | 2068264 A2 * | 6/2009 | G06F 21/62 |

(Continued)

OTHER PUBLICATIONS

Dasari et al., "Aegis: A framework to detect compromised components in the supply chain of information technology infrastructure", IEEE 2020, International Workshop on Big Data and Information Security (IWBIS), pp. 159-164.

(Continued)

*Primary Examiner* — Shahriar Zarrineh
(74) *Attorney, Agent, or Firm* — DORITY & MANNING P.A.

(57) ABSTRACT

Provided are computing systems that feature a centralized attestation device able to perform attestation on behalf of a number of different platform components. More particularly, the present disclosure provides extensible mechanisms for representing trustworthiness statements by an attester device within a platform either as implicit attestation or explicit attestation. Thus, according to one aspect of the present disclosure, a computing system can include an attester (Continued)

device that implements a hybrid model for presenting evidence of measurements of all the components in a platform to a verifier.

18 Claims, 5 Drawing Sheets

(56) References Cited

U.S. PATENT DOCUMENTS

| | | | |
|---|---|---|---|
| 2019/0230002 A1* | 7/2019 | Bernat | H04L 41/0893 |
| 2019/0364042 A1* | 11/2019 | Liu | H04W 12/069 |
| 2020/0127980 A1* | 4/2020 | Smith | H04L 67/12 |
| 2020/0193065 A1* | 6/2020 | Smith | G06F 21/73 |
| 2020/0322176 A1* | 10/2020 | Bhandari | H04L 9/0825 |
| 2020/0327231 A1* | 10/2020 | Smith | G06F 21/33 |
| 2020/0351105 A1* | 11/2020 | Melo | G06F 16/2379 |
| 2021/0021609 A1* | 1/2021 | Smith | H04L 45/72 |
| 2021/0111892 A1* | 4/2021 | Vahldiek-Oberwagner | G06F 21/57 |
| 2021/0314365 A1* | 10/2021 | Smith | G06F 11/301 |
| 2022/0004627 A1 | 1/2022 | Smith et al. | |
| 2022/0038272 A1* | 2/2022 | Hershman | H04L 9/0866 |
| 2022/0138286 A1* | 5/2022 | Zage | H04L 63/0428 726/26 |
| 2022/0222348 A1* | 7/2022 | Vaswani | H04L 9/0825 |
| 2023/0274002 A1* | 8/2023 | Orlando | G06F 21/575 713/189 |
| 2024/0232332 A9* | 7/2024 | Gurel | H04L 63/10 |

FOREIGN PATENT DOCUMENTS

| | | | | |
|---|---|---|---|---|
| JP | 2007329916 A | * | 12/2007 | G06F 21/31 |
| NL | 2029297 A | * | 6/2022 | |
| WO | WO-2020205514 A1 | * | 10/2020 | G06F 21/33 |
| WO | WO-2022132360 A1 | * | 6/2022 | G06F 21/572 |

OTHER PUBLICATIONS

International Preliminary Report on Patentability for Application No. PCT/US2023/015858, mailed Jun. 30, 2023, 16 pages.
International Preliminary Report on Patentability for Application No. PCT/US2023/015858, mailed Oct. 3, 2024, 10 pages.

* cited by examiner

COMPUTING SYSTEMS FEATURING CENTRALIZED ATTESTATION DEVICE

PRIORITY

The present application is based upon and claims the right of priority under 35 U.S.C. § 371 to International Application No. PCT/US2023/015858, filed Mar. 22, 2023, which claims the benefit of priority under 35 U.S.C. § 119 to U.S. Provisional Patent Application No. 63/322,348, filed Mar. 22, 2022. Applicant claims priority to and the benefit of each of such applications and incorporates all such applications herein by reference in their entirety.

FIELD

The present disclosure relates generally to security within a computer system or network. More particularly, the present disclosure relates to computing systems that feature a centralized attestation device able to perform attestation on behalf of a number of different platform components.

BACKGROUND

Attestation can refer to the process of vouching for the accuracy of information. In some instances, the goal of attestation is to prove to a remote party (e.g., a verifier) that component(s) of a computing system (e.g., including the hardware, operating system, or application software) are intact and trustworthy.

In some instances, attestations can be based on measurements made with respect to one or more components. In some instances, a measurement can be a digest of code or configuration data. Thus, measurement can refer to the process by which information about component(s) (e.g., identifiers therefor or code present thereon) is collected and digested.

One example context in which measurement and attestation can occur is the Device Identifier Composition Engine (DICE) framework promulgated by the Trusted Computing Group (TCG). Certain published DICE attestation approaches take a layer-by-layer approach in which each component/layer generates a measurement of the next component/layer and then produces a Compound Device Identifier (CDI) based on the measurement (e.g., a hash) derived from the CDI of the previous layer. The CDI computed at layer n can then be used to generate an attestation for layer n+1, and so on.

SUMMARY

Aspects and advantages of embodiments of the present disclosure will be set forth in part in the following description, or can be learned from the description, or can be learned through practice of the embodiments.

One example aspect of the present disclosure is directed to a computer system with improved security. The computer system includes an attester device configured to communicate with one or more platform components and a verifier to perform attestation operations on behalf of the one or more platform components. The attestation operations include receiving, from a first component of the one or more platform components, a measurement collected by the first component. The attestation operations include generating a hash value based at least in part on the measurement collected by the first component; receiving a challenge from the verifier. The attestation operations include generating a hash key based at least in part on the hash value. The attestation operations include signing the challenge using the hash key to generate a signed challenge. The attestation operations include transmitting the signed challenge to the verifier.

Another example aspect is directed to an attester device configured to communicate with a plurality of different platform components and a verifier to perform attestation operations on behalf of the platform components. The attestation operations include maintaining a rolling hash value. The attestation operations include obtaining a measurement collected from at least one component of the plurality of different platform components. The attestation operations include extending the rolling hash value based at least in part on the measurement. The attestation operations include receiving a challenge from the verifier. The attestation operations include generating a hash key based at least in part on the rolling hash value. The attestation operations include signing the challenge using the hash key to generate a signed challenge. The attestation operations include transmitting the signed challenge to the verifier.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Generally, the present disclosure is directed to computing systems that feature a centralized attestation device able to perform attestation on behalf of a number of different platform components. More particularly, the present disclosure provides extensible mechanisms for representing trustworthiness statements by an attester device within a platform either as implicit attestation or explicit attestation. Thus, according to one aspect of the present disclosure, a computing system can include an attester device that implements a hybrid model for presenting evidence of measurements of all the components in a platform to a verifier.

The present disclosure provides an improved trust boundary in which a trustworthy attester device (e.g., executing in its own computing environment) can manage usage and derivation of key material corresponding to both the measurements made by the attester device and measurements made by other components in the platform. Thus, aspects of the present disclosure are directed to a dedicated and centralized attester device that can perform attestation on behalf of a plurality of different components of a computing system. Specifically, in some implementations, the attester device can be capable of performing both explicit and implicit attestation, as the case warrants.

In some implementations, the measurements made by the attester device or received by the attester device are hashed and the hash is kept by the attester device. Then, for example when requested by a verifier, the trustworthy attester device can derive a hash key (e.g., which can be referred to as $K_{RollingHash}$) from the current rolling hash value. Additionally, in some implementations, the attester device can generate or maintain an attester device key.

The attester device can sign an input challenge from the verifier with the hash key (e.g., $K_{RollingHash}$) and also present the certificate chain ending with the certificate over the hash key (e.g., $K_{RollingHash}$) as the leaf certificate to the verifier. This proves the authenticity of the hash key (e.g., $K_{RollingHash}$) whose trust can, in some implementations, be transitively rooted in a trusted root certificate.

Thus, unlike certain approaches in which different measurements are represented separately in the evidence, the example implementations which leverage a rolling hash value ensure that only the evidence of the rolling hash is presented to the verifier. This approach simplifies representation of evidence while ensuring that all measurements of the platform are still captured in the evidence. This can result in conservation of computing resources such as reducing usage of network bandwidth, etc.

Another benefit with the proposed scheme is that the attester device does not need to do more resource-intensive asymmetric cryptographic operations every time new measurements are made. This can result in conservation of computing resources such as processor usage, memory usage, etc.

The proposed scheme also leads to a smaller Trusted Computing Base (TCB) as the complexity of software in the attester device can be limited to, for example, deriving cryptographic identity corresponding to the rolling hash value and attesting to an input challenge. Further, only a single instance of this attestation software is held at the attester device instead of, for example, being replicated redundantly at each component/layer. This can result in conservation of computing resources such as resulting in a smaller memory footprint required by the system as a whole.

With reference now to the Figures, example embodiments of the present disclosure will be discussed in further detail.

Figure 1:
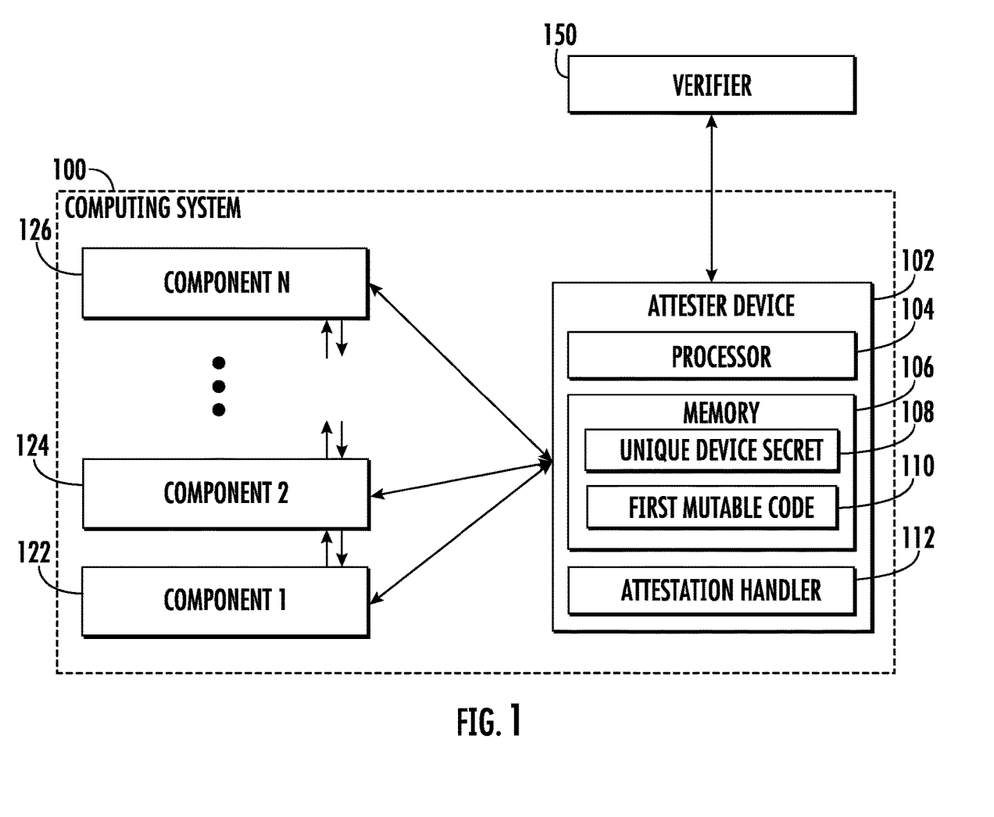
FIG. 1 depicts a block diagram of an example computing system according to example embodiments of the present disclosure.

FIG. 1 depicts a block diagram of an example computing system 100 according to example embodiments of the present disclosure. The computing system 100 can include an attester device 102 and a plurality of different components (e.g., shown as components 122-126).

In some implementations, the computing system 100 contains or is embodied as a single computing device, such as, for example, a personal computer, a laptop, an embedded device, a gaming console, a smartphone, a wearable device, a server computing device, etc. Thus, the attester device 102 and the components 122-126 can be included in the same physical device. In other implementations, the computing system 100 can include multiple computing devices communicating and operating in collaboration. Thus, in some instances, the attester device 102 and the components 122-126 can be contained in separate physical devices. In either situation (e.g., single device or multiple devices), the attester device 102 can optionally be executed or otherwise implemented in a separate computing environment from the components 122-126.

The attester device 102 can include one or more processors 104 and a memory 106. The one or more processors 104 can include any suitable processing device (e.g., a processor core, a microprocessor, an ASIC, an FPGA, a controller, a microcontroller, etc.) and can be one processor or a plurality of processors that are operatively connected. The memory 106 can include one or more non-transitory computer-readable storage media, such as RAM, ROM, EEPROM, EPROM, flash memory devices, magnetic disks, etc., and combinations thereof. The memory 106 can store data and instructions which are executed by the processor 104 to cause the attester device 102 to perform operations.

The memory 106 can also store a unique device secret (UDS) 108. The UDS 108 can be a statistically unique, device-specific, secret value. The UDS 108 can be generated externally and installed during manufacture or generated internally during device provisioning. The UDS 108 can be stored in a non-volatile portion of memory 106, or other suitably protected area to which access can be restricted.

The memory 106 can also store a set of first mutable code 110. The first mutable code 110 can also be referred to as "Layer 0" and can be the first computer language code (e.g., encoded as firmware) that is executed by the one or more processors upon boot of the attester device 102. As one example, the first mutable code 110 can include the Basic Input/Output System (BIOS) (also known as the System BIOS, ROM BIOS, BIOS ROM or PC BIOS), which is firmware used to provide runtime services for operating systems and programs and to perform hardware initialization during the booting process (power-on startup).

The attester device 102 can also include an attestation handler 112. The attestation handler 112 can include computer logic (e.g., embodied in computer-readable instructions) for performing authentication operations described herein. For example, the attestation handler 112 can perform the operations shown and described with reference to the attester device in FIG. 2. The attestation handler 112 can be embodied in hardware, firmware, or software.

Similar to the attester device 102, each of the components 122-126 can have a unique identifier (e.g., a TCB Component Identifier (TCI)). In some implementations, some, or all of the components 122-126 can be able to communicate (e.g., collect measurements from) some or all of the other components. As one example, component 1 122 can be able to collect measurement(s) from component 2 124, and so on.

The computing system 100 in general and the attester device 102 more specifically can also be communicatively connected to a verifier 150. The verifier 150 can be local (e.g., on the same device(s)) or remote (e.g., on a separate device (e.g., a server device) accessible via a network (e.g., the Internet)). The verifier 150 can be an entity that evaluates credentials to produce a credential. For example, the verifier 150 can receive information from the attester device 102 and analyze it to pass judgment on the trustworthiness (e.g., security posture) of the system 100 or specific component(s) thereof. In some examples, the verifier 150 can be a TPM.

Figure 2:
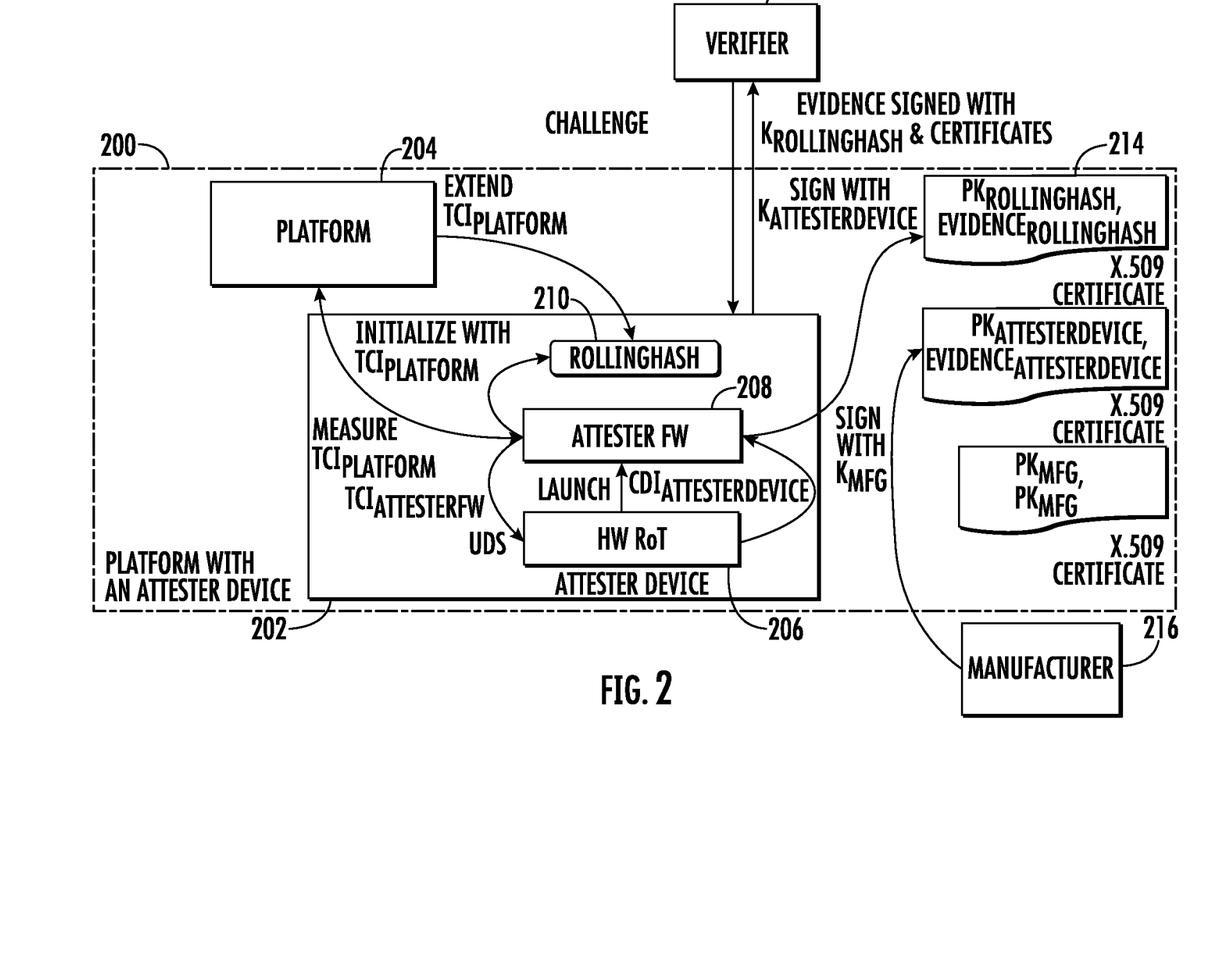
FIG. 2 depicts a graphical diagram of an example workflow for performing attestation according to example embodiments of the present disclosure.

FIG. 2 depicts a graphical diagram of an example workflow for performing attestation according to example embodiments of the present disclosure. For example, a platform 200 can include an attester device 202 and platform component(s) 204. The attester device 202 can include a hardware root of trust (HW ROT) 206 and attester firmware 208. The hardware root of trust 206 can launch the attester firmware 208.

The hardware root of trust 206 can store a UDS. The hardware root of trust 206 can collect a $TCI_{AttesterFW}$ from the attester firmware 208. The hardware root of trust 206 can generate a Compound Device Identifier for the attester device $CDI_{AttesterDevice}$ from the UDS and the $TCI_{AttesterFW}$.

The attester device 202 can measure the platform 204 to generate a $TCI_{Platform}$. The attester device 202 can initialize a RollingHash 210 with the $TCI_{Platform}$. In addition, new measurements from the platform 204 can be used to extend the RollingHash 210. In some implementations, the attester device can maintain a rolling hash value that is updated (e.g., extended) over time as additional measurements are collected or received.

In particular, in some implementations, the platform 204 can request an Extend operation from the attester device 202. This Extend operation can be issued to extend the RollingHash by the input measurements. For example, the Extend operation can change the value of the RollingHash in the attester device as:

RollingHash=Hash(RollingHash∥New Measurements)

The attester device 202 can also receive (directly or indirectly) a challenge from a verifier 212. The attester device 202 can sign the challenge with a hash key ($K_{RollingHash}$) generated from the RollingHash 210.

In particular, in some implementations, the platform 204 or the verifier 212 can request a Sign operation from the attester device 202. This Sign operation can be issued to get the attester device to sign the given challenge with the hash key $K_{RollingHash}$ that is derived using the RollingHash and an input derivation constant given by the caller.

Formally, in some implementations, the attester device can derive $CDI_{RollingHash}=KDF(CDI_{AttesterDevice}, RollingHash)$ where $CDI_{AttesterDevice}$ is the CDI made available to the attester device and KDF is a key derivation function. $K_{RollingHash}$ can be derived using $CDI_{RollingHash}$ and an input derivation constant. $K_{RollingHash}$ can be used to sign the input challenge given by the caller.

In addition, in some implementations, the attester device 102 can also sign a certificate 214 over a public portion of the hash key ($K_{RollingHash}$) using an attester device key ($K_{AttesterDevice}$). The attester device key can be derived from a chain of information/evidence starting from a manufacturer (MFG) 216.

In particular, in some implementations, the platform 204 or the verifier 212 can request a GetAliasKeyCertificate operation from the attester device 202. This GetAliasKeyCertificate operation can be issued to the attester device to get a certificate over $PK_{RollingHash}$ generated by the attester device 202 using an input derivation constant given by the caller and signed with $K_{AttesterDevice}$.

Formally, the attester device 202 can derive $CDI_{RollingHash}=KDF(CDI_{AttesterDevice}, RollingHash)$ where $CDI_{AttesterDevice}$ is the CDI made available to the attester device and KDF is a key derivation function. $K_{RollingHash}$ can be derived using $CDI_{RollingHash}$ and an input derivation constant.

The public portion of $K_{RollingHash}$ (e.g., $PK_{RollingHash}$) can be encoded in a certificate 214. The RollingHash can also be encoded in the certificate 214. For example, it can be encoded as a TCG-DICE-FWID x509 extension. The certificate can be signed using $K_{AttesterDevice}$.

In some implementations, the attester device 202 can return the entire DICE certificate chain with $K_{RollingHash}$ as the leaf certificate, certificate over $K_{AttesterDevice}$, and so on until the trusted self-signed root certificate.

In some implementations, the platform 204 or the verifier 212 can request a GetRollingHash operation from the attester device 202. This GetRollingHash operation can be issued to request the attester device 202 requesting for information on the current value of the RollingHash.

Figure 3:
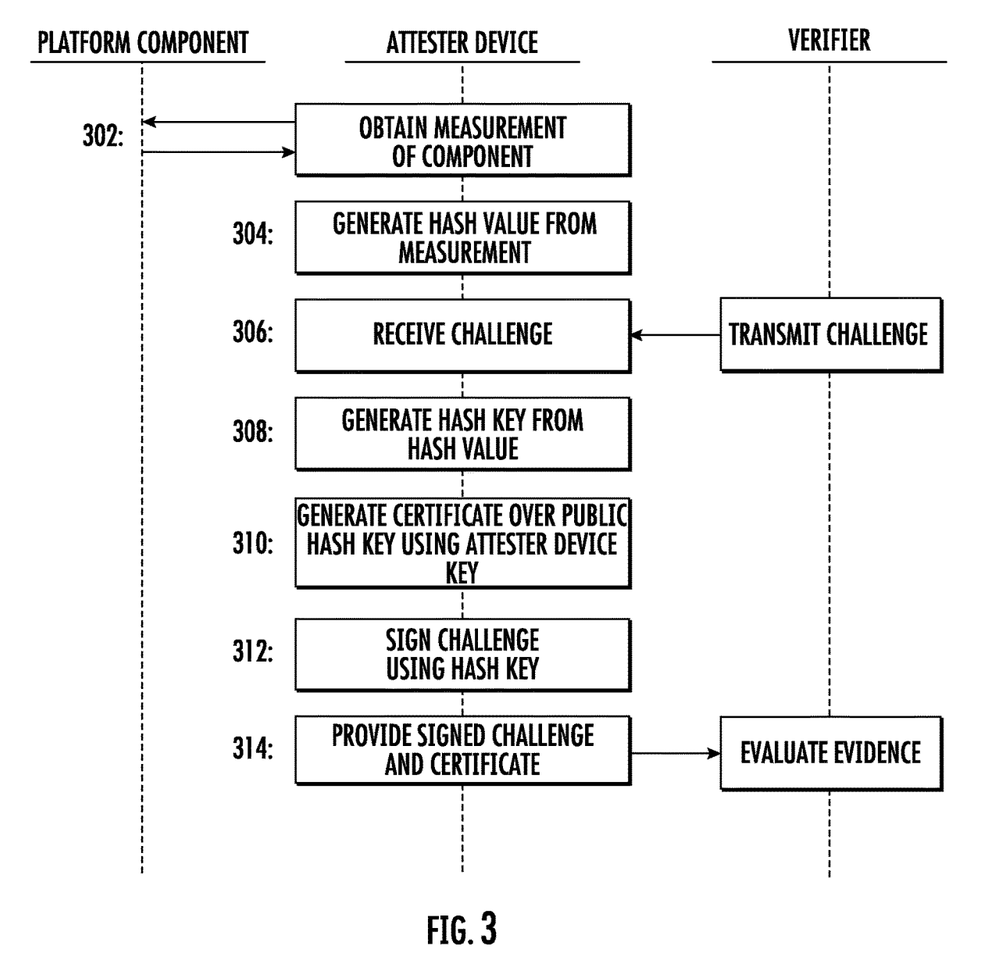
FIG. 3 depicts a swim lane diagram of an example technique to perform explicit attestation according to example embodiments of the present disclosure.

FIG. 3 depicts a swim lane diagram of an example technique to perform explicit attestation according to example embodiments of the present disclosure.

At 302, an attester device can obtain a measurement of a component. The component can be one of many platform components. The attester device can receive the measurement collected by the component (e.g., a first component). The measurement can include, for example, measurements from a host CPU's boot software, root of truth (RoT) measurements, firmware measurements, unified extensible firmware interface (UEFI) measurements, security requirements tracing matrix (S-RTM) measurements, etc.

In some implementations, the measurement can include an explicit measurement. For instance, an explicit measurement can be performed by the attester device, verifier, and a platform component.

The measurement collected by the component can be a measurement collected by a first component. For instance, the measurement collected by the first component can include a measurement of a second, different component. The platform component can be one of multiple platform components. The platform components can include components of a Trusted Computing Base (TCB) in a Device Identifier Composition Engine (DICE) framework.

At 304, the attester device can generate a hash value from the measurement. The attester device can include a hardware root of trust having a unique device secret (UDS). The attester device can generate the hash value based on the measurement collected by the first component. In some instances, the measurements can be hashed, and the hash can be kept (e.g., stored) by the attester device. For instance, the attester device can maintain a rolling hash value (e.g., RollingHash) which can be updated (e.g., extended) as additional measurements are collected (e.g., received from additional components). By way of example, the RollingHash value can be extended as follows:

RollingHash=Hash(RollingHash∥New Measurements)

At 306, the attester device can receive a challenge from a verifier. For instance, the verifier can generate or transmit a request. In response to the request, the trustworthy attester device can derive a hash key (e.g., $K_{RollingHash}$) from a current rolling hash value. In some implementations, the verifier can include a Trusted Platform Module (TPM). In some instances, the attester device can generate a Compound Device Identifier (CDI) for the attester device (e.g., $CDI_{AttesterDevice}$) based on a UDS (e.g., a UDS associated with the trustworthy attester device). In some implementations, the attester device can generate the CDI based on a hash of the first mutable code (e.g., firmware) on the attester device.

At 308, the attester device can generate a hash key from the hash value. For instance, the attester device can generate, based on the CDI for the attester device (e.g., $CDI_{AttesterDevice}$) and the hash value (e.g., RollingHash), a combined CDI for a combination of the attester device and the hash value (e.g., $CDI_{RollingHash}$). The attester device can perform a key derivation function (KDF) on the combined CDI (e.g., $CDI_{RollingHash}$) to generate the hash key (e.g., $K_{RollingHash}$).

At 310, the attester device can generate a certificate over a public portion of the hash key using an attester device key. For instance, the hash value can be encoded within the certificate over the public portion of the hash key. In some instances, the attester device can generate or maintain an attester device key (e.g., $K_{AttesterDevice}$). The attester device can generate the certificate over a public portion of the hash key (e.g., $K_{RollingHash}$) based on the attester device key (e.g., $K_{AttesterDevice}$). For instance, the attester device can sign the certificate using the attester device key. In some implementations, the hash value or other evidence can be encoded within the certificate over the public portion of the hash key. The attester device can present a certificate chain ending with the certificate over the public portion of the hash key as a leaf certificate to the verifier.

At 312, the attester device can sign the challenge using the hash key. For instance, the attester device can sign the input challenge from the verifier using the hash key (e.g., $K_{RollingHash}$) to generate a signed challenge. Additionally, or alternatively, the attester device can present the certificate chain ending with the certificate over the hash key (e.g., $K_{RollingHash}$) whose trust can be transitively rooted in a trusted root certificate. In this way, each time a new measurement is made, a new layer of the Rolling Hash framework can be generated and utilized for computing device security. This can prevent the need for more resource-intensive asymmetric cryptography operations being performed for each new measurement.

At 314, the attester device can provide the signed challenge and the certificate to the verifier for evaluation. For instance, the attester device can transmit the signed challenge to the verifier. The verifier can receive the signed challenge and determine if the signed challenge satisfies the challenge. Unlike certain approaches in which different measurements are represented separately in the evidence, the example implementations which leverage a rolling hash value ensure that only the evidence of the rolling hash is presented to the verifier. This approach simplifies representation of evidence while ensuring that all measurements of the platform are still captured in the evidence. This can result in conservation of computing resources such as reducing usage of network bandwidth, etc.

Figure 5:
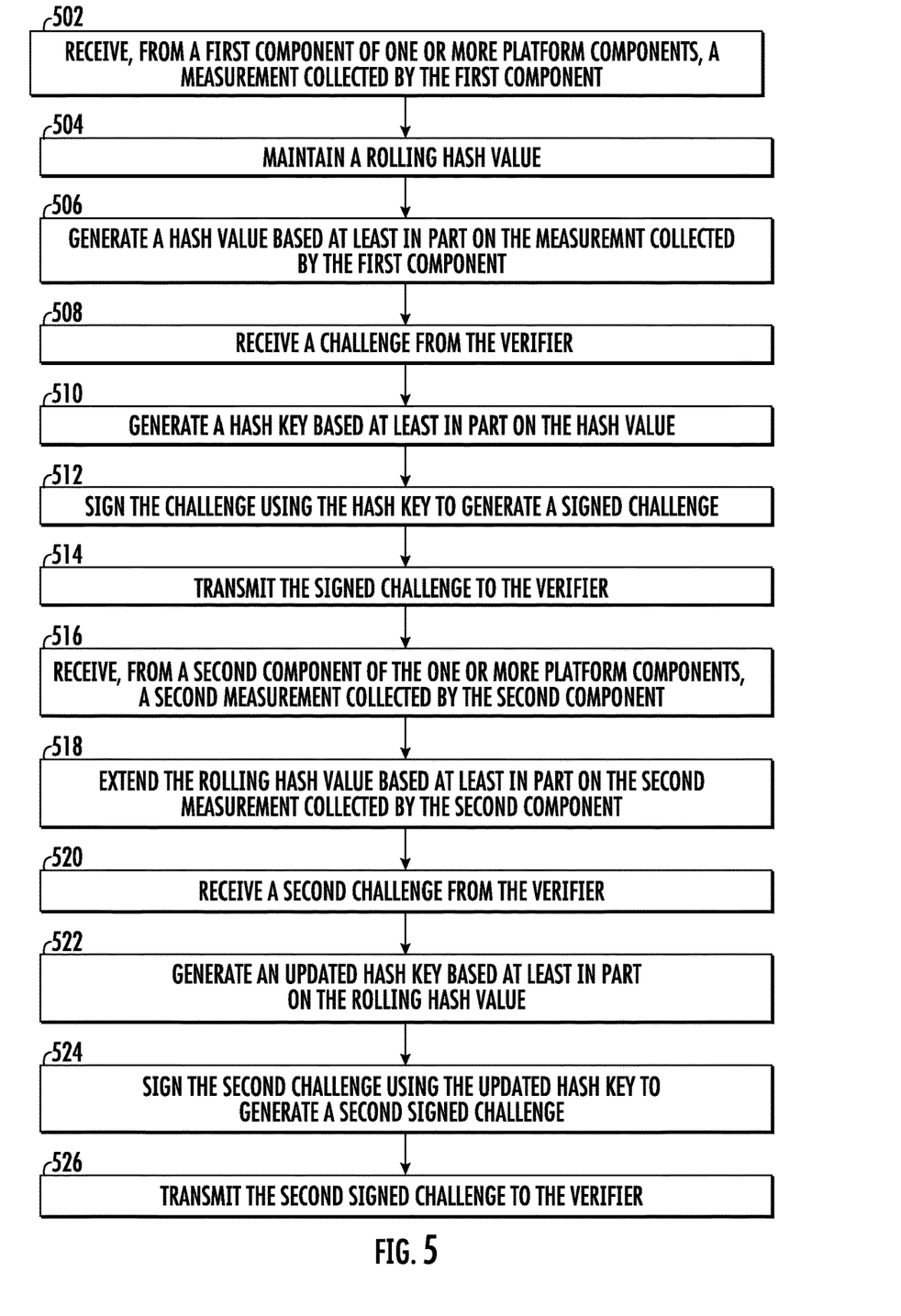
FIG. 5 depicts a flow chart diagram of an example method for performing attestation according to example embodiments of the present disclosure.

The attester device can repeat some of steps 302 to 314 for instance involving more than one platform component (e.g., as depicted in FIG. 5). By way of example, the attester device can maintain a rolling hash value. The hash value can be based on the measurement collected by the first component including extending the rolling hash value based on the measurement collected by the first component.

For instance, the attester device can receive from a second component, a second measurement collected by the second component. The attester device can receive a second challenge from the verifier. Based on the second challenge from the verifier, the attester device can generate an updated hash key based on a rolling hash value. The attester device can sign the second challenge using the updated hash key to generate a second signed challenge. The attester device can transmit the second signed challenge to the verifier.

In some implementations, the evidence over the rolling hash value is still presented as an extension in a certificate to a verifier instead of an explicitly signed manifest. Expressing evidence in a certificate corresponding to a cryptographic identity derived using the evidence leads to the platform as a whole assuming an identity separate from the trustworthy attester device. This helps with the platform being able to use the new identity to participate in more complex security protocols like, for example, satisfying a Trusted Platform Module (TPM) policy. At the same time, complex security/communication protocols need not be supported in the firmware of the attester device.

In some implementations, the attester device can operate in a separate computing environment from the platform component(s). Additionally or alternatively, communications between the attester device and the platform component(s) can be structured according to a predefined application programming interface (API). Thus, in some implementations, the proposed techniques can be used as a standard API on internal roots of trust (iRoT) for measurement(s) within a system on a chip (SoC) to be able to derive keys related to the system's measurements. The derived keys can be used to secure communications between the attester device and the verifier. For example, the verifier can be a TPM (e.g., running on a general purpose Root of Trust chip). For example, the verifier (e.g., TPM) can provide verification for datacenter devices (servers, NICs, etc.).

The present disclosure provides for an array of implementations. In some implementations, the attester device is executed within an attester computing environment that is separate from the platform computing environments associated with the platform components. In some implementations, the attester device is executed within an attester computing device that is not separate from the platform computing environments associated with the platform components. In some instances, the communications between the attester device and the one or more platform components are structured according to a pre-defined application programming interface (API).

FIG. 3 depicts an example of an explicit attestation scheme. An explicit attestation scheme is useful for establishing direct trust, e.g., when the verifier is to be presented only with evidence of measurements made by the attester device directly. However, an implicit attestation scheme, as depicted in FIG. 4, is useful for establishing transitive trust, where components measured by a trusted attester device are provided evidence and identity which continue to do the same until the final component in the platform can present cumulative evidence encoded in a certificate chain to a verifier.

Thus, an implicit attestation scheme can be helpful for extending the trustworthiness of the platform beyond the measurements made directly by the attester device. However, in certain potential implicit attestation schemes, the responsibility of managing the integrity of key material and performing cryptographic operations rests with the entire platform instead of just the attester device in the platform. In platforms with a clear trust boundary between a trustworthy attester device and the rest of the components in a platform, this scheme can not be preferable, because Compound Device Identifier (CDI) key material is deemed sensitive and is not safe to be shared across trust boundaries.

Figure 4:
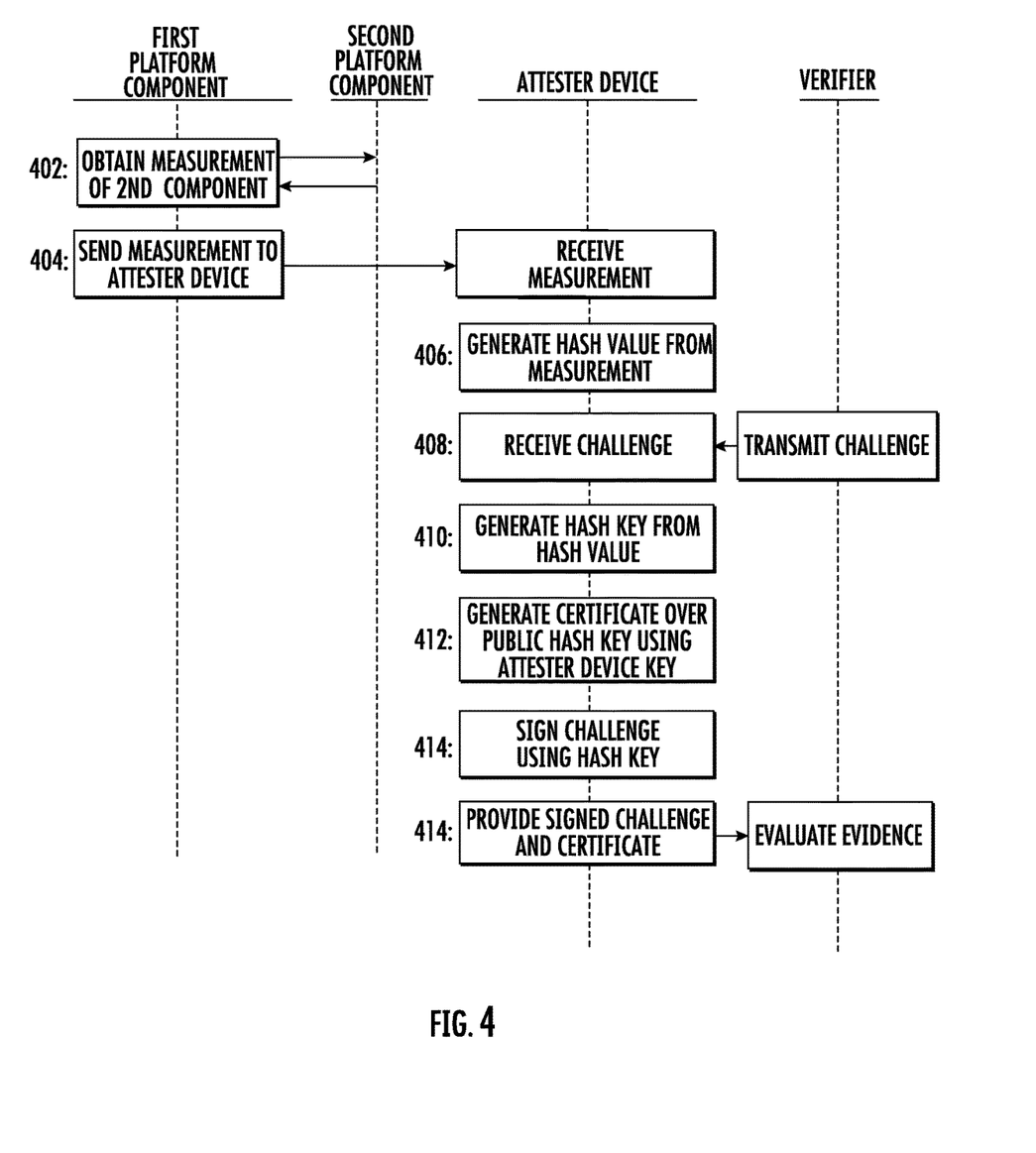
FIG. 4 depicts a swim lane diagram of an example technique to perform implicit attestation according to example embodiments of the present disclosure.

FIG. 4 depicts a swim lane diagram of an example technique to perform implicit attestation according to example embodiments of the present disclosure.

At 402, a first component can obtain a measurement of a second component. For instance, the second component can be a different component from the first component.

At 404, the first component can send the measurement to an attester device. For instance, the attester device can receive a measurement collected from a component of a number of different platform components.

At 406, the attester device can generate a hash value from the measurement. For example, the attester device can update (e.g., extend) a rolling hash value. In some instances, the attester device can update a maintained rolling hash value. In some implementations, the attester device can extend the rolling hash value based on the measurement.

In some implementations, the attester device can maintain a rolling hash value. For instance, the attester device can generate the hash value based on the measurement collected by the first component including extending the rolling hash value based on the measurement collected by the first component.

At 408, the attester device can receive a challenge from a verifier. In some implementations, the verifier can include a Trusted Platform Module (TPM). In some instances, the attester device can generate a Compound Device Identifier (CDI) for the attester device based on a UDS (e.g., a UDS associated with a hardware root of trust). For instance, the verifier can generate or transmit a request. In response to the request, the trustworthy attester device can derive a hash key (e.g., $K_{RollingHash}$) from a current rolling hash value. In some implementations, the verifier can include a Trusted Platform Module (TPM). In some instances, the attester device can generate a Compound Device Identifier (CDI) for the attester device (e.g., $CDI_{AttesterDevice}$) based on a UDS (e.g., a UDS associated with the trustworthy attester device). In some implementations, the attester device can generate the CDI based on a hash of the first mutable code (e.g., firmware) on the attester device.

At 410, the attester device can generate a hash key from the hash value. For instance, the attester device can generate, based on the CDI for the attester device (e.g., $CDI_{AttesterDevice}$) and the hash value (e.g., RollingHash), a combined CDI for a combination of the attester device and the hash value (e.g., $CDI_{RollingHash}$). The attester device can perform a key derivation function (KDF) on the combined CDI (e.g., $CDI_{RollingHash}$) to generate the hash key (e.g., $K_{RollingHash}$).

At 412, the attester device can generate a certificate over a public portion of the hash key using an attester device key. For instance, the hash value can be encoded within the certificate over the public portion of the hash key. In some instances, the attester device can generate or maintain an attester device key (e.g., $K_{AttesterDevice}$). The attester device can generate the certificate over a public portion of the hash key (e.g., $K_{RollingHash}$) based on the attester device key (e.g., $K_{AttesterDevice}$). For instance, the attester device can sign the certificate using the attester device key. In some implementations, the hash value or other evidence can be encoded within the certificate over the public portion of the hash key. The attester device can present a certificate chain ending with the certificate over the public portion of the hash key as a leaf certificate to the verifier.

At 414, the attester device can sign the challenge using the hash key. For instance, the attester device can sign the challenge using the hash key to generate as signed challenge. For instance, the attester device can sign the certificate with an attester device key. For instance, the attester device can sign the input challenge from the verifier using the hash key (e.g., $K_{RollingHash}$) to generate a signed challenge. Additionally, or alternatively, the attester device can present the certificate chain ending with the certificate over the hash key (e.g., $K_{RollingHash}$) whose trust can be transitively rooted in a trusted root certificate. In this way, each time a new measurement is made, a new layer of the Rolling Hash framework can be generated and utilized for computing device security. This can prevent the need for more resource-intensive asymmetric cryptography operations being performed for each new measurement.

At 416, the attester device can provide the signed challenge and the certificate to the verifier for evaluation. For instance, the attester device can transmit the signed challenge to the verifier. The verifier can receive the signed challenge and determine if the signed challenge satisfies the challenge. Unlike certain approaches in which different measurements are represented separately in the evidence, the example implementations which leverage a rolling hash value ensure that only the evidence of the rolling hash is presented to the verifier. This approach simplifies representation of evidence while ensuring that all measurements of the platform are still captured in the evidence. This can result in conservation of computing resources such as reducing usage of network bandwidth, etc.

The sessions shown in FIGS. 3 and 4 can be repeated (e.g., for the same or different components). The sessions shown in FIGS. 3 and 4 can be performed by the same attester device (e.g., a hybrid attester device) for the same or different components.

FIG. 5 depicts a flow chart diagram of an example method to perform attestation by a centralized attestation device according to example embodiments of the present disclosure. Although FIG. 5 depicts steps performed in a particular order for purposes of illustration and discussion, the methods of the present disclosure are not limited to the particularly illustrated order or arrangement. The various steps of method 500 can be omitted, rearranged, combined, or adapted in various ways without deviating from the scope of the present disclosure.

In some instances, a computer system can perform the steps of method 500. The computer system can include an attester device configured to communicate with one or more platform components and a verifier to perform attestation operations on behalf of the one or more platform components.

At 502, method 500 can include receiving, from a first component of the one or more platform components, a measurement collected by the first component. As described herein, the measurement can include an explicit measurement or implicit measurement.

At 504, method 500 can include maintaining a rolling hash value. The rolling hash value can be updated (e.g., extended) as additional measurements are collected (e.g., received from additional components).

At 506, method 500 can include generating a hash value based at least in part on the measurement collected by the first component. In some instances, the measurements can be hashed, and the hash can be kept (e.g., stored) by the attester device.

At 508, method 500 can include receiving a challenge from the verifier. For instance, the verifier can generate or transmit a request. In response to the request, the trustworthy attester device can derive a hash key (e.g., $K_{RollingHash}$) from a current rolling hash value. In some implementations, the verifier can include a Trusted Platform Module (TPM). In some instances, the attester device can generate a Compound Device Identifier (CDI) for the attester device (e.g., $CDI_{AttesterDevice}$) based on a UDS (e.g., a UDS associated with the trustworthy attester device). In some implementations, the attester device can generate the CDI based on a hash of the first mutable code (e.g., firmware) on the attester device.

At 510, method 500 can include generating a hash key based at least in part on the hash value. For instance, the attester device can generate, based on the CDI for the attester device (e.g., $CDI_{AttesterDevice}$) and the hash value (e.g., RollingHash), a combined CDI for a combination of the attester device and the hash value (e.g., $CDI_{RollingHash}$). The attester device can perform a key derivation function (KDF) on the combined CDI (e.g., $CDI_{RollingHash}$) to generate the hash key (e.g., $K_{RollingHash}$).

At 512, method 500 can include signing the challenge using the hash key to generate a signed challenge. For instance, the attester device can sign the input challenge from the verifier using the hash key (e.g., $K_{RollingHash}$) to generate a signed challenge. Additionally, or alternatively, the attester device can present the certificate chain ending with the certificate over the hash key (e.g., $K_{RollingHash}$) whose trust can be transitively rooted in a trusted root certificate. In this way, each time a new measurement is made, a new layer of the Rolling Hash framework can be generated and utilized for computing device security. This can prevent the need for more resource-intensive asymmetric cryptography operations being performed for each new measurement.

At 514, method 500 can include transmitting the signed challenge to the verifier. For instance, the attester device can transmit the signed challenge to the verifier. The verifier can receive the signed challenge and determine if the signed challenge satisfies the challenge. Unlike certain approaches in which different measurements are represented separately in the evidence, the example implementations which leverage a rolling hash value ensure that only the evidence of the rolling hash is presented to the verifier. This approach simplifies representation of evidence while ensuring that all measurements of the platform are still captured in the evidence. This can result in conservation of computing resources such as reducing usage of network bandwidth, etc.

At 516, method 500 can include receiving, from a second component of the one or more platform components, a second measurement collected by the second component.

At 518, method 500 can include extending the rolling hash value based at least in part on the second measurement collected by the second component. For instance, the attestor device can obtain a second measurement of a second component. The attester device can maintain a rolling hash value (e.g., RollingHash) which can be updated (e.g., extended) as additional measurements are collected (e.g., received from additional components). By way of example, the Rolling-Hash value can be extended as follows:

RollingHash=Hash(RollingHash||New Measurements)

At 520, method 500 can include receiving a second challenge from the verifier. The attestor can receive a second challenge from the verifier.

At 522, method 500 can include generating an updated hash key based at least in part on the rolling hash value. The attestor device can extend the rolling hash value based on the second measurement. The attestor device can generate an updated hash key based on the rolling hash value.

At 524, method 500 can include signing the second challenge using the updated hash key to generate a second signed challenge. The attestor device can sign the second challenge using the updated hash key to generate a second signed challenge.

At 526, method 500 can include transmitting the second signed challenge to the verifier. The attestor device can transmit the second signed challenge to the verifier.

In some instances, the attester device can be executed within an attester computing environment that is separate from the platform computing environments associated with the different platform components. In some implementations, the communications between the attester device and the different platform components are structured according to a pre-defined application programming interface (API).

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

The depicted or described steps are merely illustrative and can be omitted, combined, or performed in an order other than that depicted or described; the numbering of depicted steps is merely for ease of reference and does not imply any particular ordering is necessary or preferred.

The functions or steps described herein can be embodied in computer-usable data or computer-executable instructions, executed by one or more computers or other devices to perform one or more functions described herein. Generally, such data or instructions include routines, programs, objects, components, data structures, or the like that perform particular tasks or implement particular data types when executed by one or more processors in a computer or other data-processing device. The computer-executable instructions can be stored on a computer-readable medium such as a hard disk, optical disk, removable storage media, solid-state memory, read-only memory (ROM), random-access memory (RAM), or the like. As will be appreciated, the functionality of such instructions can be combined or distributed as desired. In addition, the functionality can be embodied in whole or in part in firmware or hardware equivalents, such as integrated circuits, application-specific integrated circuits (ASICs), field-programmable gate arrays (FPGAs), or the like. Particular data structures can be used to implement one or more aspects of the disclosure more effectively, and such data structures are contemplated to be within the scope of computer-executable instructions or computer-usable data described herein.

Although not required, one of ordinary skill in the art will appreciate that various aspects described herein can be embodied as a method, system, apparatus, or one or more computer-readable media storing computer-executable instructions. Accordingly, aspects can take the form of an entirely hardware embodiment, an entirely software embodiment, an entirely firmware embodiment, or an embodiment combining software, hardware, or firmware aspects in any combination.

As described herein, the various methods and acts can be operative across one or more computing devices or networks. The functionality can be distributed in any manner or can be located in a single computing device (e.g., server, client computer, user device, or the like).

Aspects of the disclosure have been described in terms of illustrative embodiments thereof. Numerous other embodiments, modifications, or variations within the scope and spirit of the appended claims can occur to persons of ordinary skill in the art from a review of this disclosure. For example, one or ordinary skill in the art can appreciate that the steps depicted or described can be performed in other than the recited order or that one or more illustrated steps can be optional or combined. Any and all features in the following claims can be combined or rearranged in any way possible.

Aspects of the disclosure have been described in terms of illustrative embodiments thereof. Numerous other embodiments, modifications, or variations within the scope and spirit of the appended claims can occur to persons of ordinary skill in the art from a review of this disclosure. Any and all features in the following claims can be combined or rearranged in any way possible. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. Lists joined by a particular conjunction such as "or," for example, can refer to "at least one of" or "any combination of" example elements listed therein, with "or" being understood as "and/or" unless otherwise indicated. Also, terms such as "based on" should be understood as "based at least in part on."

In particular, although the Figures respectively depict steps performed in a particular order for purposes of illustration and discussion, the methods of the present disclosure are not limited to the particularly illustrated order or arrangement. The various steps of the methods described herein can be omitted, rearranged, combined, or adapted in various ways without deviating from the scope of the present disclosure.

What is claimed is:

1. A computer system with improved security, the computer system comprising:
   an attester device configured to communicate with one or more platform components and a verifier to perform attestation operations on behalf of the one or more platform components, the attestation operations comprising:
   receiving, from a first component of the one or more platform components, a measurement collected by the first component;
   generating a hash value based at least in part on the measurement collected by the first component;
   receiving a challenge from the verifier;
   generating a hash key based at least in part on the hash value;
   signing the challenge using the hash key to generate a signed challenge;
   transmitting the signed challenge to the verifier;
   generating a certificate over a public portion of the hash key and signing the certificate with an attester device key; and
   presenting a certificate chain ending with the certificate over the public portion of the hash key as a leaf certificate to the verifier.

2. The computer system of claim 1, wherein the hash value is encoded within the certificate over the public portion of the hash key.

3. The computer system of claim 1, wherein:
   the attestation operations comprise maintaining a rolling hash value; and
   generating the hash value based at least in part on the measurement collected by the first component comprises extending the rolling hash value based at least in part on the measurement collected by the first component.

4. The computer system of claim 3, wherein the attestation operations further comprise:
   receiving, from a second component of the one or more platform components, a second measurement collected by the second component;
   extending the rolling hash value based at least in part on the second measurement collected by the second component;
   receiving a second challenge from the verifier;
   generating an updated hash key based at least in part on the rolling hash value;
   signing the second challenge using the updated hash key to generate a second signed challenge; and
   transmitting the second signed challenge to the verifier.

5. The computer system of claim 1, wherein the attester device is executed within an attester computing environment that is separate from one or more platform computing environments associated with the one or more platform components.

6. The computer system of claim 1, wherein communications between the attester device and the one or more platform components are structured according to a predefined application programming interface (API).

7. The computer system of claim 1, wherein the verifier comprises a Trusted Platform Module (TPM).

8. The computer system of claim 1, wherein the one or more platform components comprise components of a Trusted Computing Base (TCB) in a Device Identifier Composition Engine (DICE) framework.

9. The computer system of claim 1, wherein the attester device comprises a hardware root of trust having a unique device secret (UDS).

10. The computer system of claim 9, wherein:
    the attestation operations further comprise generating a Compound Device Identifier (CDI) for the attester device based at least in part on the UDS; and
    generating the hash key based at least in part on the hash value comprises:
      generating, based on the CDI for the attester device and the hash value, a combined CDI for a combination of the attester device and the hash value; and
      performing a key derivation function on the combined CDI to generate the hash key.

11. The computer system of claim 1, wherein:
    the measurement collected by the first component comprises a measurement of a second, different component; and
    the attestation operations comprise an attestation for the second, different component.

12. The computer system of claim 1, further comprising the one or more platform components.

13. An attester device configured to communicate with a plurality of different platform components and a verifier to perform attestation operations on behalf of the platform components, the attestation operations comprising:

maintaining a rolling hash value;

obtaining a measurement collected from at least one component of the plurality of different platform components;

extending the rolling hash value based at least in part on the measurement;

receiving a challenge from the verifier;

generating a hash key based at least in part on the rolling hash value;

signing the challenge using the hash key to generate a signed challenge;

transmitting the signed challenge to the verifier;

generating a certificate over a public portion of the hash key and signing the certificate with an attester device key; and     presenting a certificate chain ending with the certificate over the public portion of the hash key as a leaf certificate to the verifier.

14. The attester device of claim 13, wherein the measurement comprises an explicit measurement directly performed by the attester device.

15. The attester device of claim 13, wherein the measurement comprises an implicit measurement not directly performed by the attester device.

16. The attester device of claim 13, wherein the attestation operations further comprise:

generating a certificate over a public portion of the hash key; and     signing the certificate with an attester device key.

17. The attester device of claim 13, wherein the attestation operations further comprise:

obtaining a second measurement of a second component;

extending the rolling hash value based at least in part on the second measurement;

receiving a second challenge from the verifier;

generating an updated hash key based at least in part on the rolling hash value;

signing the second challenge using the updated hash key to generate a second signed challenge; and     transmitting the second signed challenge to the verifier.

18. The attester device of claim 13, wherein:

the attester device is executed within an attester computing environment that is separate from one or more platform computing environments associated with the plurality of different platform components; and communications between the attester device and the plurality of different platform components are structured according to a pre-defined application programming interface (API).

* * * * *